(12) United States Patent
Oh et al.

(10) Patent No.: US 11,411,248 B2
(45) Date of Patent: Aug. 9, 2022

(54) COMPOSITION FOR GEL POLYMER ELECTROLYTE INCLUDING SILOXANE OLIGOMER, LITHIUM SALT, AND PHOSPHATE OR BORON-BASED ANION STABILIZING ADDITIVE, GEL POLYMER ELECTROLYTE PREPARED THEREFROM, AND LITHIUM SECONDARY BATTERY INCLUDING THE GEL POLYMER ELECTROLYTE

(71) Applicant: LG Chem, Ltd., Seoul (KR)

(72) Inventors: Jeong Woo Oh, Daejeon (KR);
Kyoung Ho Ahn, Daejeon (KR); Chul Haeng Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 200 days.

(21) Appl. No.: 16/607,206

(22) PCT Filed: Nov. 13, 2018

(86) PCT No.: PCT/KR2018/013817
§ 371 (c)(1),
(2) Date: Oct. 22, 2019

(87) PCT Pub. No.: WO2019/093862
PCT Pub. Date: May 16, 2019

(65) Prior Publication Data
US 2020/0373614 A1 Nov. 26, 2020

(30) Foreign Application Priority Data
Nov. 13, 2017 (KR) .......................... 10-2017-0150919

(51) Int. Cl.
*H01M 10/0565* (2010.01)
*H01M 10/0525* (2010.01)
*H01M 4/02* (2006.01)

(52) U.S. Cl.
CPC ... *H01M 10/0565* (2013.01); *H01M 10/0525* (2013.01); *H01M 2004/027* (2013.01);
(Continued)

(58) Field of Classification Search
CPC ...................... H01M 10/0565; H01M 10/0525
(Continued)

(56) References Cited

U.S. PATENT DOCUMENTS

| 10,243,239 B1 | 3/2019 | Ahn et al. |
| 2011/0111289 A1* | 5/2011 | Choi ................. H01M 10/052 |
| | | 429/207 |

(Continued)

FOREIGN PATENT DOCUMENTS

| CN | 106165179 A | 11/2016 |
| CN | 106797048 A | 5/2017 |

(Continued)

OTHER PUBLICATIONS

Extended European Search Report issued from the European Patent Office dated Jun. 3, 2020 in corresponding European patent application No. 18876065.6.

(Continued)

*Primary Examiner* — Sean P Cullen
(74) *Attorney, Agent, or Firm* — Morgan, Lewis & Bockius LLP

(57) ABSTRACT

The present invention relates to a composition for a gel polymer electrolyte, which includes an oligomer represented by Formula 1, an anion stabilizing additive, a polymerization initiator, a lithium salt, and a non-aqueous solvent, wherein the anion stabilizing additive includes at least one (Continued)

selected from the group consisting of a phosphite-based compound represented by Formula 2 and a boron-based compound represented by Formula 3, and a gel polymer electrolyte and a lithium secondary battery which are prepared by using the same.

17 Claims, 4 Drawing Sheets

(52) U.S. Cl.
CPC .............. *H01M 2004/028* (2013.01); *H01M 2300/0082* (2013.01); *H01M 2300/0085* (2013.01)

(58) Field of Classification Search
USPC ........................................ 429/300, 302, 303
See application file for complete search history.

(56) References Cited

U.S. PATENT DOCUMENTS

| | | | |
|---|---|---|---|
| 2011/0183213 A1* | 7/2011 | Inoue | H01M 10/0569 429/324 |
| 2011/0294003 A1 | 12/2011 | Zhang et al. | |
| 2012/0141878 A1* | 6/2012 | Ohashi | H01M 10/0525 429/300 |
| 2013/0029232 A1 | 1/2013 | Zheng et al. | |
| 2013/0136998 A1 | 5/2013 | Hwang et al. | |
| 2013/0280618 A1 | 10/2013 | Shinmei et al. | |
| 2014/0234728 A1 | 8/2014 | Jeon et al. | |
| 2015/0325879 A1 | 11/2015 | Yu et al. | |
| 2016/0028111 A1* | 1/2016 | Ahn | H01M 10/0565 429/303 |
| 2016/0226103 A1 | 8/2016 | Teran et al. | |
| 2017/0110759 A1 | 4/2017 | Boeckmann et al. | |
| 2017/0229735 A1* | 8/2017 | Ahn | H01M 10/0525 |
| 2019/0013520 A1 | 1/2019 | Yu et al. | |
| 2019/0036162 A1* | 1/2019 | Oh | C08F 299/024 |

FOREIGN PATENT DOCUMENTS

| | | | |
|---|---|---|---|
| EP | 3203565 A1 | 8/2017 | |
| JP | 2011-222431 A | 11/2011 | |
| KR | 20070013840 A * | 1/2007 | |
| KR | 10-2010-0056581 A | 5/2010 | |
| KR | 10-2011-0086513 A | 7/2011 | |
| KR | 10-2013-0058403 A | 6/2013 | |
| KR | 10-2013-0100884 A | 9/2013 | |
| KR | 10-2013-0118806 A | 10/2013 | |
| KR | 10-2013-0119922 A | 11/2013 | |
| KR | 10-2015-0048658 A | 5/2015 | |
| KR | 10-2015-0050508 A | 5/2015 | |
| KR | 10-2016-0040128 A | 4/2016 | |
| KR | 10-2017-0062256 A | 6/2017 | |
| WO | 2016/053064 A1 | 4/2016 | |
| WO | WO-2016053065 A1 * | 4/2016 | H01M 10/0569 |

OTHER PUBLICATIONS

Choi et al., "Challenges Facing Lithium Batteries and Electrical Double-Layer Capacitors," Angewandte Chemie International Edition, vol. 51, No. 40, pp. 9994-10024 (2012).

* cited by examiner

COMPOSITION FOR GEL POLYMER ELECTROLYTE INCLUDING SILOXANE OLIGOMER, LITHIUM SALT, AND PHOSPHATE OR BORON-BASED ANION STABILIZING ADDITIVE, GEL POLYMER ELECTROLYTE PREPARED THEREFROM, AND LITHIUM SECONDARY BATTERY INCLUDING THE GEL POLYMER ELECTROLYTE

CROSS-REFERENCES TO RELATED APPLICATIONS

This application is a U.S. national phase application, pursuant to 35 U.S.C. § 371, of PCT/KR2018/013817, filed Nov. 13, 2018, designating the United States, which claims priority to Korean Application No. 10-2017-0150919, filed Nov. 13, 2017. The entire contents of the aforementioned patent applications are incorporated herein by this reference.

TECHNICAL FIELD

The present invention relates to a composition for a gel polymer electrolyte, a gel polymer electrolyte prepared therefrom, and a lithium secondary battery including the gel polymer electrolyte, and more particularly, to a composition for a gel polymer electrolyte, in which stability of the lithium secondary battery is improved by suppressing a side reaction caused by anions of a lithium salt during charge, a gel polymer electrolyte prepared therefrom, and a lithium secondary battery including the gel polymer electrolyte.

BACKGROUND ART

Recently, there has been a growing demand for high performance, high stability secondary batteries as electric, electronic, communication, and computer industries have rapidly developed. Particularly, in line with miniaturization and lightweight trends of electronic (communication) devices, thin-film and miniaturized lithium secondary batteries, as core components in this field, are required.

Lithium secondary batteries may be divided into a lithium ion battery using a liquid electrolyte and a lithium polymer battery using a polymer electrolyte depending on the electrolyte used.

However, when the electrolyte in a liquid state is used, the possibilities of degrading an electrode material and volatizing the organic solvent are not only high, but also there is a problem in safety, for example, combustion caused by increases in ambient temperature and temperature of the battery itself. In particular, the lithium secondary battery has limitations in that a thickness of the battery increases due to the gas which is generated in the battery due to the decomposition of a carbonate organic solvent and/or a side reaction between the organic solvent and an electrode during charge and discharge. Thus, degradation of performance and safety of the battery occurs.

In general, it is known that battery safety improves in the order of a liquid electrolyte, a gel polymer electrolyte, and a solid polymer electrolyte, but battery performance decreases in the same order. Currently, it is known that the solid polymer electrolyte has not been commercialized yet due to poor battery performance.

In contrast, since the gel polymer electrolyte has excellent electrochemical stability, the thickness of the battery may not only be constantly maintained, but a contact between the electrode and the electrolyte may also be excellent due to the inherent adhesion of a gel phase, and thus, a thin-film type battery may be prepared. As a method of preparing a secondary battery in which the gel polymer electrolyte is used, the following two methods are known.

First, there is a method in which, after surfaces of a positive electrode, a negative electrode, and a separator are coated with a composition for a gel polymer electrolyte, gelation is performed by using heat or ultraviolet (UV) light, a battery is then prepared by combining them, and a conventional liquid electrolyte solution is further injected thereinto.

However, since the method further includes a non-aqueous organic solvent, it is not satisfactory in terms of performance as well as thermal stability of the secondary battery.

As another method, there is a method of preparing a battery containing a gel polymer electrolyte, wherein a composition for forming a gel, in which a polymerizable monomer and a polymerization initiator are mixed with a liquid electrolyte solution in which a salt is dissolved in a non-aqueous organic solvent, is injected into a battery including an electrode assembly in which a positive electrode, a negative electrode, and a separator are wound or stacked, and gelation (crosslinking) is then performed under appropriate temperature and time conditions. However, the method is disadvantageous in that safety during a wetting process and a heating process for the gelation are low.

Also, with respect to the above method, the salt may undergo a chemical reaction to generate anions of the salt. Particularly, when $LiBF_4$ or $LiPF_6$ based on fluorinated Lewis acid is used among lithium salts, there are characteristics that ionic conductivity is high and it hardly causes a side reaction in the electrode, but a by-product, such as HF, may be generated by the anions formed by the chemical reaction, wherein the by-product may continuously degrade the performance of the battery by decomposing an electrolyte solution solvent or causing an electrode side reaction.

Therefore, there is a need to develop a technique for a gel polymer electrolyte for preparing a secondary battery having improved overall performance such as performance and stability.

(Patent Document 1) Korean Patent Application Laid-open Publication No. 10-2010-0056581

DISCLOSURE OF THE INVENTION

Technical Problem

An aspect of the present invention provides a composition for a gel polymer electrolyte, in which stability of a lithium secondary battery is improved by suppressing a side reaction caused by anions of a lithium salt during charge, a gel polymer electrolyte prepared therefrom, and a lithium secondary battery including the gel polymer electrolyte.

Technical Solution

According to an aspect of the present invention, there is provided a composition for a gel polymer electrolyte including: an oligomer represented by Formula 1; an anion stabilizing additive; a polymerization initiator; a lithium salt; and a non-aqueous solvent, wherein the anion stabilizing additive includes at least one selected from the group consisting of a phosphite-based compound represented by Formula 2 and a boron-based compound represented by Formula 3.

[Formula 1]

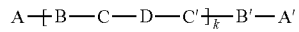

In Formula 1,

A and A' are each independently a unit containing a (meth)acrylate group,

B and B' are each independently a unit containing an amide group,

C and C' are each independently a unit containing an oxyalkylene group,

D is a unit containing a siloxane group, and k is an integer of 1 to 100.

[Formula 2]

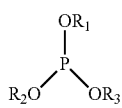

In Formula 2, $R_1$, $R_2$, and $R_3$ are each independently at least one selected from the group consisting of a substituted or unsubstituted, linear or non-linear alkyl group having 1 to 10 carbon atoms, a substituted or unsubstituted, linear or non-linear alkoxy group having 1 to 10 carbon atoms, an aryl group having 6 to 20 carbon atoms which is substituted or unsubstituted with a substituted or unsubstituted alkyl group having 1 to 10 carbon atoms, and a substituted or unsubstituted, linear or non-linear alkylsilyl group having 1 to 10 carbon atoms.

[Formula 3]

In Formula 3, $R_4$, $R_5$, and $R_6$ are each independently at least one selected from the group consisting of a substituted or unsubstituted aryl group having 6 to 20 carbon atoms, a substituted or unsubstituted, linear or non-linear alkyl group having 1 to 10 carbon atoms, and a substituted or unsubstituted, linear or non-linear alkoxy group having 1 to 10 carbon atoms.

Preferably, $R_1$, $R_2$, and $R_3$ in Formula 2 may be fluorine-substituted linear or non-linear alkyl groups having 1 to 10 carbon atoms.

Preferably, $R_4$, $R_5$, and $R_6$ in Formula 3 may be fluorine-substituted aryl groups having 6 to 20 carbon atoms.

Specifically, the anion stabilizing additive may include a phosphite-based compound represented by Formula 2-1.

[Formula 2-1]

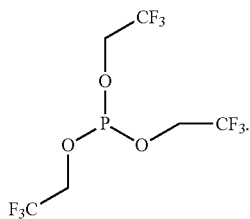

Also, the anion stabilizing additive may include a boron-based compound represented by Formula 3-1.

[Formula 3-1]

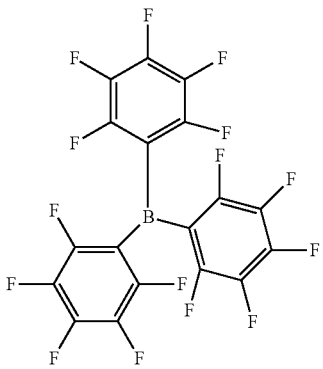

According to another aspect of the present invention, there are provided a gel polymer electrolyte prepared by using the composition for a gel polymer electrolyte according to the present invention, and a lithium secondary battery including the gel polymer electrolyte.

Advantageous Effects

Since a gel polymer electrolyte according to the present invention includes an additive capable of stabilizing anions generated from the lithium salt, a battery having improved performance, stability, and high-temperature stability may be achieved by suppressing decomposition of the non-aqueous solvent by the anions or the side reaction with the electrode.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

MODE FOR CARRYING OUT THE INVENTION

Figure 1:
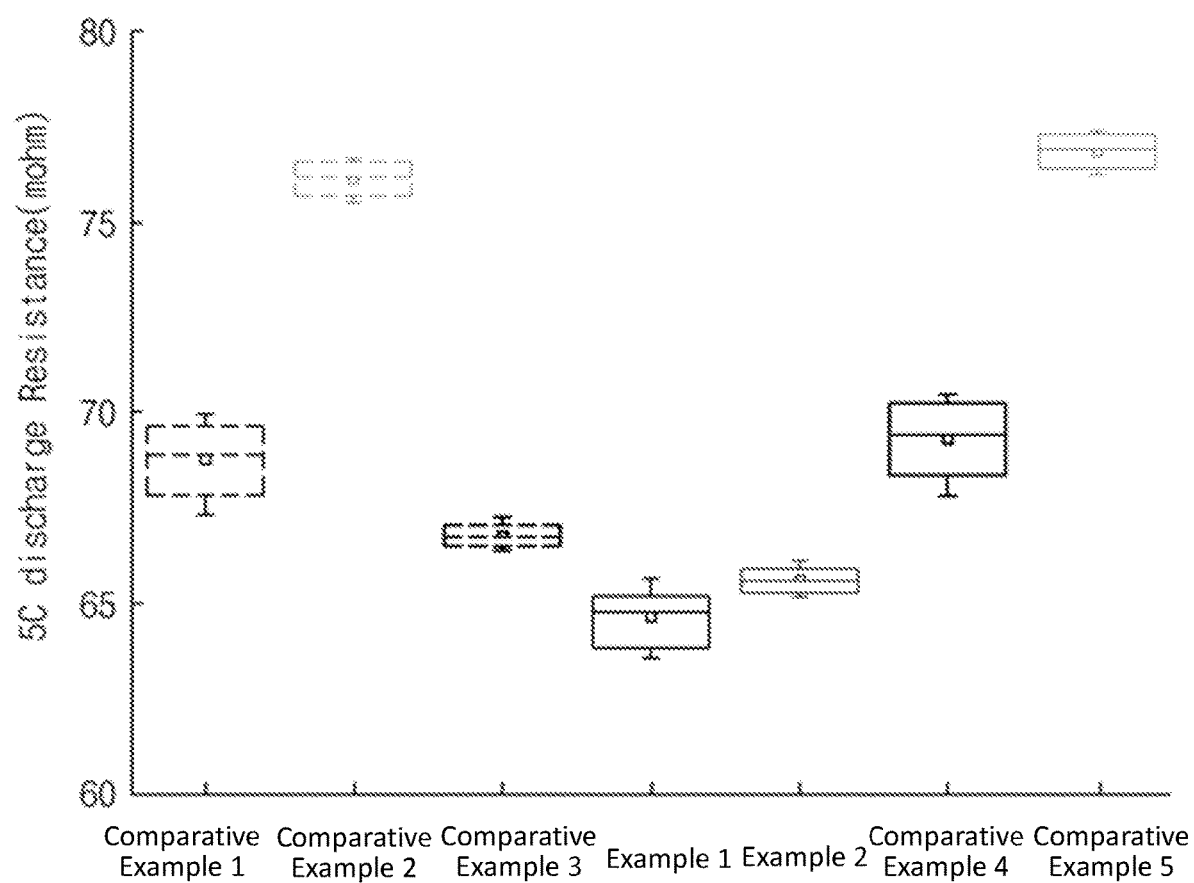
FIG. 1 is a graph showing measured resistance values of secondary batteries according to Experimental Example 1 of the present invention.

Hereinafter, the present invention will be described in more detail to allow for a clearer understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

The terminology used herein is for the purpose of describing particular example embodiments only and is not intended to be limiting of the present invention. In the specification, the terms of a singular form may include plural forms unless referred to the contrary.

It will be further understood that the terms "include," "comprise," or "have" when used in this specification, specify the presence of stated features, numbers, steps, elements, or combinations thereof, but do not preclude the presence or addition of one or more other features, numbers, steps, elements, or combinations thereof.

Unless otherwise specified in the present invention, the expression "*" denotes the same or different atom or a portion connected between ends of a formula.

<Composition for Gel Polymer Electrolyte>

A composition for a gel polymer electrolyte according to the present invention includes an oligomer; an anion stabilizing additive; a polymerization initiator; a lithium salt; and a non-aqueous solvent.

Oligomer

First, the oligomer will be described.

The oligomer includes a (meth)acrylate group, an amide group, an oxyalkylene group and a siloxane group.

A gel polymer electrolyte generally used is disadvantageous in that safety and mechanical properties are inferior to those of a solid polymer electrolyte and ionic conductivity is lower than that of a liquid electrolyte. Thus, research to improve the mechanical properties or ionic conductivity by using an oligomer copolymer has recently been conducted.

However, when the oligomer is used as an electrolyte alone, the control of physical properties is not only not easy, but it may also be difficult to use the oligomer in a high capacity large battery because it is difficult to uniformly form a polymer in the battery.

Thus, the present invention aims at solving these problems by using an oligomer containing a functional group capable of complementing electrochemical properties and mechanical properties.

In this case, the oligomer is represented by Formula 1 below.

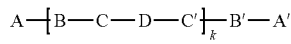

[Formula 1]

In formula 1,

A and A' are each independently a unit containing a (meth)acrylate group, B and B' are each independently a unit containing an amide group, C and C' are each independently a unit containing an oxyalkylene group, D is a unit containing a siloxane group, and k is an integer of 1 to 100.

k may preferably be an integer of 1 to 50, and may more preferably be an integer of 1 to 30. When k is within the above range, the oligomer represented by Formula 1 has an appropriate weight-average molecular weight (Mw).

In this case, the weight-average molecular weight in the present specification may denote a standard polystyrene-equivalent value measured by gel permeation chromatography (GPC), and, unless otherwise specified, a molecular weight may denote the weight-average molecular weight. For example, in the present invention, the weight-average molecular weight is measured by using 1200 series by Agilent Technologies, a PL mixed B column by Agilent Technologies may be used in this case, and tetrahydrofuran (THF) may be used as a solvent.

A weight-average molecular weight (Mw) of the oligomer represented by Formula 1 may be controlled by the number of repeating units, and may be in a range of about 1,000 g/mol to about 20,000 g/mol, particularly 1,000 g/mol to 15,000 g/mol, and more particularly 1,000 g/mol to 10,000 g/mol. When the weight-average molecular weight of the oligomer is within the above range, mechanical strength of a battery including the same may be effectively improved, and a gel polymer electrolyte having improved processability (moldability) and battery stability may be prepared.

The units A and A' are units containing a (meth)acrylate group so that the oligomer may form a polymer network by being bonded in a three-dimensional structure. The units A and A' may be derived from monomers containing at least one monofunctional or multifunctional (meth)acrylate or (meth)acrylic acid in the molecular structure.

For example, the units A and A' may each independently include at least one unit selected from units represented by Formulae A-1 to A-5 below.

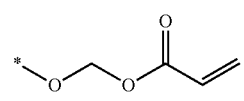

[Formula A-1]

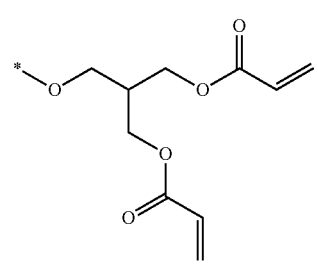

[Formula A-2]

[Formula A-3]

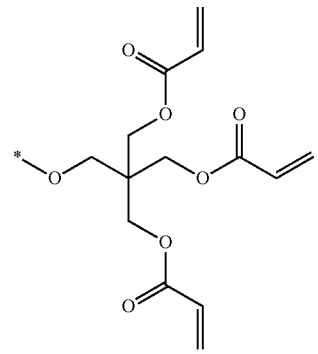

[Formula A-4]

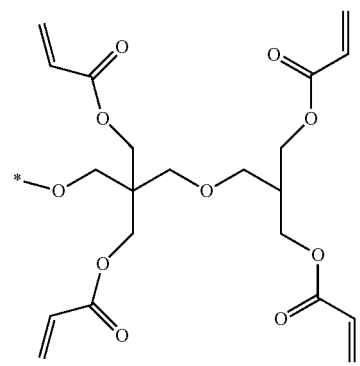

[Formula A-5]

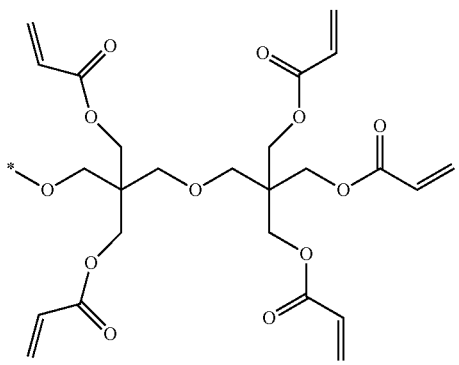

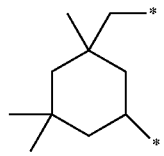
[Formula R'-3]

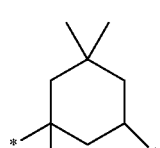
[Formula R'-4]

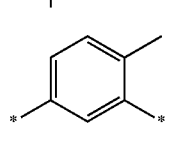
[Formula R'-5]

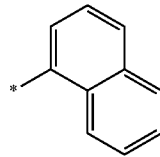
[Formula R'-6]

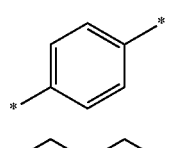
[Formula R'-7]

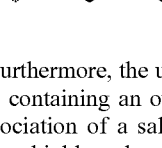
[Formula R'-8]

Also, the units B and B' are each independently a unit containing an amide group, in order to control ion transfer characteristics and to give the ability to control mechanical properties and adhesion in realizing the gel polymer electrolyte.

For example, the units B and B' may each independently include a unit represented by Formula B-1 below.

[Formula B-1]

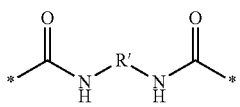

In Formula B-1,

R' is at least one selected from the group consisting of a linear or non-linear alkylene group having 1 to 10 carbon atoms, a substituted or unsubstituted cycloalkylene group having 3 to 10 carbon atoms, a substituted or unsubstituted bicycloalkylene group having 6 to 20 carbon atoms, a substituted or unsubstituted arylene group having 6 to 20 carbon atoms, a unit represented by the following Formula R'-1, and a unit represented by the following Formula R'-2.

[Formula R'-1]

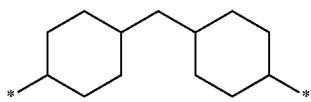

[Formula R'-2]

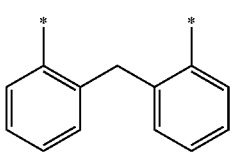

As another example, in Formula B-1,

R' may include at least one selected from units represented by Formulae R'-3 to R'-8 below.

Furthermore, the units C and C' are each independently a unit containing an oxyalkylene group, in order to increase dissociation of a salt in the polymer network and affinity with a highly polar surface in the battery. Specifically, it is used to control impregnation ability of the solvent, electrode affinity, and ion transfer capability.

The units C and C' may each independently include a unit represented by Formula C-1 below.

[Formula C-1]

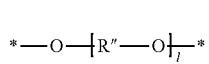

In Formula C-1, R" is a substituted or unsubstituted, linear or non-linear alkylene group having 1 to 10 carbon atoms, and l is an integer of 1 to 30.

Specifically, in Formula C-1, R" may be —CH$_2$CH$_2$— or —CHCH$_3$CH$_2$—.

Also, the unit D is a unit containing a siloxane group, in order to control mechanical properties and affinity with a separator. Specifically, it may form a structure for ensuring flexibility other than a solid structural region due to an amide bond in the polymer network and, simultaneously, may increase affinity with a polyolefin-based separator material by using low polarity. Particularly, when the affinity with the polyolefin-based separator material is improved, as the resistance is reduced, an effect of improving ionic conductivity may be achieved at the same time.

For example, the unit D may include a unit represented by Formula D-1 below.

[Formula D-1]

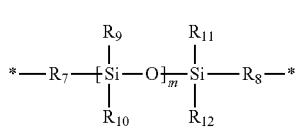

In Formula D-1, $R_7$ and $R_8$ are linear or non-linear alkylene groups having 1 to 5 carbon atoms, $R_9$, $R_{10}$, $R_{11}$, and $R_{12}$ are each independently hydrogen, an alkyl group having 1 to 5 carbon atoms, or an aryl group having 6 to 12 carbon atoms, and m is an integer of 1 to 500.

m may more preferably be an integer of 10 to 500. When m satisfies the above range, since polarity of the oligomer may be reduced, wetting of the battery may be improved. In addition, a chemical reaction with lithium metal is controlled to suppress the formation of lithium dendrites on the electrode, and thus safety of the battery may be improved.

Specifically, the unit D may be a unit represented by Formula D-2 below.

[Formula D-2]

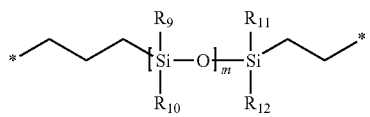

In Formula D-2, $R_9$, $R_{10}$, $R_{11}$, and $R_{12}$ are each independently hydrogen, an alkyl group having 1 to 5 carbon atoms, or an aryl group having 6 to 12 carbon atoms, and m is an integer of 1 to 500.

More specifically, the unit D-2 may be one of units represented by Formulae D-3 and D-4 below.

[Formula D-3]

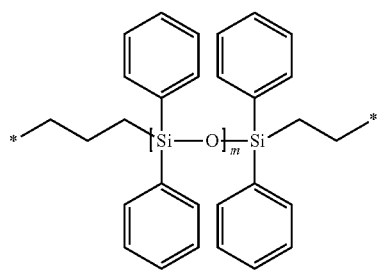

[Formula D-4]

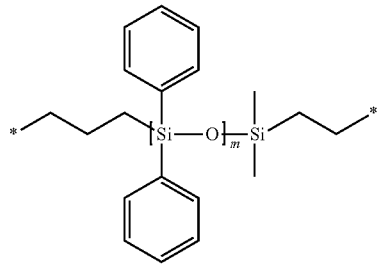

In Formula D-3 and Formula D-4, m is an integer of 1 to 500. m may more preferably be an integer of 10 to 500. When m satisfies the above range, since flame retardant properties of a gel polymer electrolyte prepared by using the oligomer containing the unit may be improved and the chemical reaction with the lithium metal electrode may be controlled, stability of the battery may be improved.

For example, according to an embodiment of the present invention, the oligomer may be at least one compound selected from the group consisting of Formulae 1-1 to 1-5 below.

[Formula 1-1]

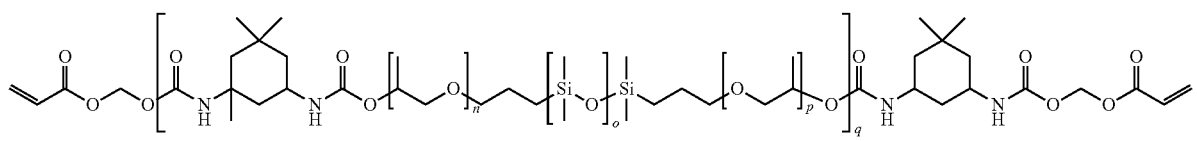

[Formula 1-2]

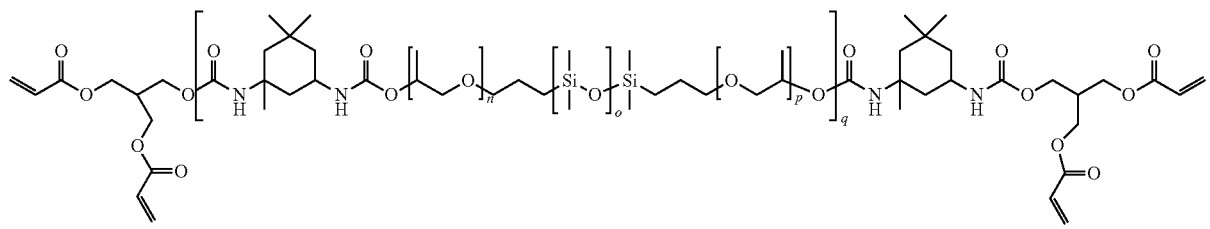

[Formula 1-3]

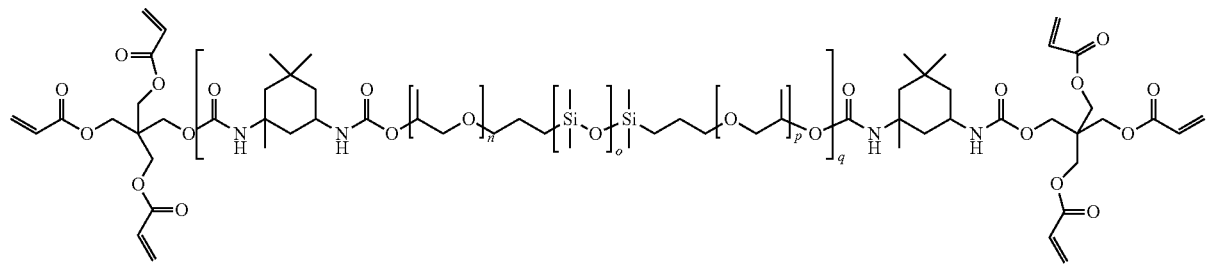

[Formula 1-4]

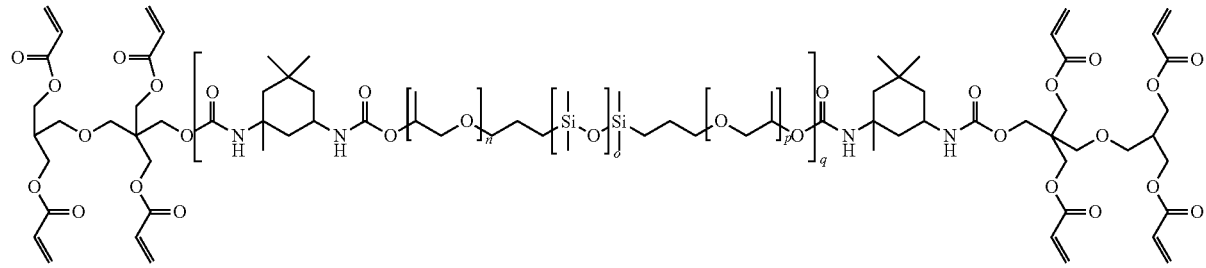

[Formula 1-5]

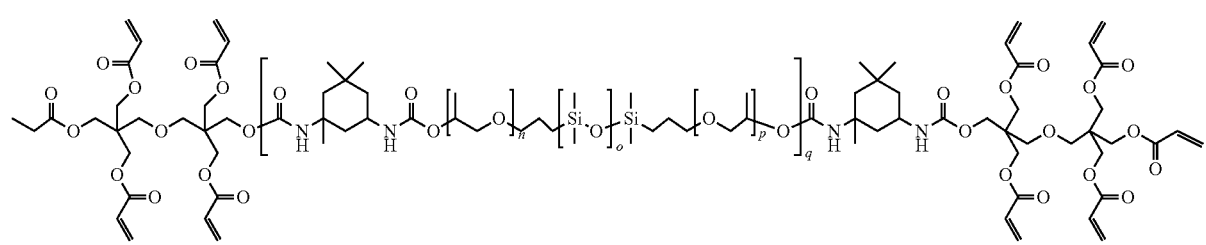

In Formulas 1-1 to 1-5, each of n, o and p are each independently an integer of 1 to 30, and q is an integer of 1 to 100.

Furthermore, q may preferably be an integer of 1 to 50, more preferably an integer of 1 to 30.

The above-described oligomer may be included in an amount of 0.5 parts by weight to 20 parts by weight, preferably 1.0 parts by weight to 20 parts by weight, more preferably 1.5 parts by weight to 20 parts by weight based on 100 parts by weight of the composition for a gel polymer electrolyte. When the amount of the oligomer is less than 0.5 part by weight, it fails to occur the network reaction required by forming the gel polymer electrolyte, whereas, when the content of the oligomer is more than 20 parts by weight, the viscosity of the gel polymer electrolyte is larger than the predetermined lever, thereby being possible to affect the lowered impregnation and wetting, and hinder the electrochemical stability.

Anion Stabilizing Additive

Next, the anion stabilizing additive will be described.

In the present invention, the anion stabilizing additive includes at least one selected from the group consisting of a phosphite-based compound and a boron-based compound.

In addition to the oligomer, a lithium salt and a non-aqueous solvent are included in the gel polymer electrolyte composition, wherein, particularly, a fluoride-based lithium salt among the lithium salts is widely used because its ionic conductivity is generally high. However, since anions formed by a chemical reaction of the fluoride-based lithium salt may generate by-products, such as HF, while reacting with a trace amount of moisture and the by-products may cause decomposition of the organic solvent and an electrode side reaction, the performance of the battery may be continuously degraded. Also, high-temperature storability of the secondary battery may be reduced by the anions and the by-products.

Specifically, for example, when $LiPF_6$ is used as the lithium salt, $PF_6^-$, as an anion, may lose electrons on a negative electrode side and $PF_5$ may be formed. In this case, the following chemical reactions may proceed in a chainwise manner.

$LiPF_6 \leftrightarrows LiF+PF_5$ $PF_5+H_2O \rightarrow POF_3+2HF$ $POF_3+H_2O \rightarrow POF_2(OH)+HF$ $POF_3+2xLi^++2xe^- \rightarrow Li_xPF_{3-x}O+xLiF$ When the chain reaction proceeds, the decomposition of the organic solvent or the side reaction with the electrode may occur due to HF and other by-products generated, and thus, the performance of the battery may be continuously degraded.

When at least one selected from the group consisting of the phosphite-based compound and the boron-based compound according to the present invention is used as the anion stabilizing additive, the anion or the by-product (e.g., $PF_6^-$ or $PF_5$) generated from the lithium salt acts as a Lewis base, and the phosphite-based compound or the boron-based compound acts as a Lewis acid. Thus, since the anions are stabilized according to a Lewis acid-base reaction, the chain reaction also does not occur, and thus, the above-described problems may be solved.

Specifically, in the present invention, the anion stabilizing additive may include a phosphite-based compound represented by Formula 2 below.

[Formula 2]

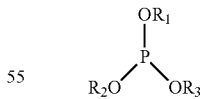

In Formula 2, $R_1$, $R_2$, and $R_3$ are each independently at least one selected from the group consisting of a substituted or unsubstituted, linear or non-linear alkyl group having 1 to 10 carbon atoms, a substituted or unsubstituted, linear or non-linear alkoxy group having 1 to 10 carbon atoms, an aryl group having 6 to 20 carbon atoms which is substituted or unsubstituted with a substituted or unsubstituted alkyl group having 1 to 10 carbon atoms, and a substituted or unsubstituted, linear or non-linear alkylsilyl group having 1 to 10 carbon atoms.

Preferably, $R_1$, $R_2$, and $R_3$ may be fluorine-substituted linear or non-linear alkyl groups having 1 to 10 carbon atoms.

Specifically, the anion stabilizing additive may include a phosphite-based compound represented by Formula 2-1 below.

[Formula 2-1]

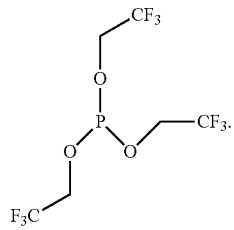

Also, in the present invention, the anion stabilizing additive may include a boron-based compound represented by Formula 3 below.

[Formula 3]

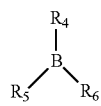

In Formula 3, $R_4$, $R_5$, and $R_6$ are each independently at least one selected from the group consisting of a substituted or unsubstituted aryl group having 6 to 20 carbon atoms, a substituted or unsubstituted, linear or non-linear alkyl group having 1 to 10 carbon atoms, and a substituted or unsubstituted, linear or non-linear alkoxy group having 1 to 10 carbon atoms.

Preferably, $R_4$, $R_5$, and $R_6$ may be fluorine-substituted aryl groups having 6 to 20 carbon atoms.

Specifically, in the present invention, the anion stabilizing additive may include a boron-based compound represented by Formula 3-1 below.

[Formula 3-1]

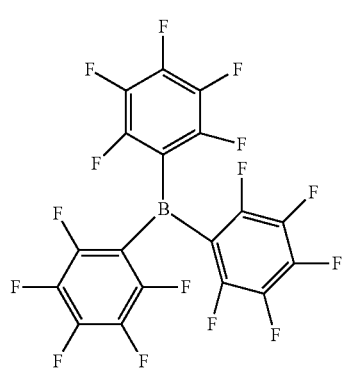

The anion stabilizing additive may be included in an amount of 0.1 part by weight to 20 parts by weight, preferably 0.5 part by weight to 20 parts by weight, and more preferably 1.0 part by weight to 20 parts by weight based on 100 parts by weight of the composition for a gel polymer electrolyte. When the amount of the anion stabilizing additive satisfies the above range, an anion stabilizing reaction may effectively occur, and the degradation of the battery performance may be minimized. Specifically, when the amount of the anion stabilizing additive is excessively small, an anion stabilizing effect may be insignificant, and, when the amount of the anion stabilizing additive is excessively large, since permittivity is reduced, the dissociation of the lithium salt may be inhibited and it may be a cause of the increase in resistance in the battery.

Polymerization Initiator

Next, the polymerization initiator will be described.

The polymerization initiator is an additive that allows the oligomer included in the composition for a gel polymer electrolyte of the present invention to form a gel polymer electrolyte by being bonded into a three-dimensional structure to form a polymer network.

Non-limiting examples of the polymerization initiator may be organic peroxides or hydroperoxides, such as benzoyl peroxide, acetyl peroxide, dilauryl peroxide, di-tert-butyl peroxide, t-butyl peroxy-2-ethyl-hexanoate, cumyl hydroperoxide, and hydrogen peroxide, and azo compounds such as 2,2'-azobis(2-cyanobutane), 2,2'-azobis(methylbutyronitrile), 2,2'-azobis(iso-butyronitrile) (AIBN), and 2,2'-azobis(dimethylvaleronitrile) (AMVN), but the present invention is not limited thereto.

The polymerization initiator may be dissociated by heat in the battery, for a non-limiting example, at a temperature of 30° C. to 100° C. or may be dissociated at room temperature (5° C. to 30° C.) to form a radical, and the oligomer may be reacted with an acrylate-based compound by free radical polymerization to form a gel polymer electrolyte.

The polymerization initiator may be included in an amount of 0.01 part by weight to 5 parts by weight, preferably 0.05 part by weight to 5 parts by weight, and more preferably 0.1 part by weight to 5 parts by weight based on 100 parts by weight of the oligomer. When the polymerization initiator is used in an amount within the above range, gelation may properly occur during the injection of the composition for a gel polymer electrolyte into the battery, and an amount of the unreacted polymerization initiator, which may adversely affect the battery performance, may be minimized. Also, when the polymerization initiator is included in an amount within the above range, the gelation may properly occur.

Lithium Salt

Next, the lithium salt will be described.

The lithium salt is used as an electrolyte salt in the lithium secondary battery, wherein it is used as a medium for transferring ions. Typically, the lithium salt may include at least one compound selected from the group consisting of $LiPF_6$, $LiBF_4$, $LiSbF_6$, $LiAsF_6$, $LiClO_4$, $LiN(C_2F_5SO_2)_2$, $LiN(CF_3SO_2)_2$, $CF_3SO_3Li$, $LiC(CF_3SO_2)_3$, $LiC_4BO_8$, LiTFSI, and LiFSI, and may preferably include $LiPF_6$, but the present invention is not limited thereto.

The lithium salt may be included in an amount of 5 parts by weight to 30 parts by weight, preferably 10 parts by weight to 30 parts by weight, and more preferably 15 parts by weight to 30 parts by weight based on 100 parts by weight of the composition for a gel polymer electrolyte. When the amount of the lithium salt is less the above range, since a concentration of lithium ions in the electrolyte is low, charge and discharge of the battery may not be properly performed, and, when the amount of the lithium salt is greater than the above range, since the wetting of the battery may be reduced due to an increase in viscosity of the gel polymer electrolyte, the battery performance may be degraded.

Non-aqueous Solvent

Next, the non-aqueous solvent will be described.

In the present invention, the non-aqueous solvent is an electrolyte solution solvent typically used in a lithium secondary battery, wherein, for example, an ether compound, an ester compound (acetates and propionates), an amide compound, a linear carbonate compound or a cyclic carbonate compound, and a nitrile compound may be used alone or as a mixture of two or more thereof.

Among them, a carbonate-based electrolyte solution solvent including cyclic carbonate, linear carbonate, or a carbonate compound as a mixture thereof may be typically used.

Specific examples of the cyclic carbonate compound may be a single compound selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, and a halide thereof, or a mixture of at least two thereof. Also, specific examples of the linear carbonate compound may be a compound selected from the group consisting of dimethyl carbonate (DMC), diethyl carbonate (DEC), dipropyl carbonate (DPC), ethylmethyl carbonate (EMC), methylpropyl carbonate (MPC), and ethylpropyl carbonate (EPC), or a mixture of at least two thereof, but the present invention is not limited thereto.

In particular, since ethylene carbonate and propylene carbonate, as cyclic carbonates among the carbonate-based electrolyte solution solvents, are highly viscous organic solvents and have high dielectric constants, the ethylene carbonate and propylene carbonate may well dissociate the lithium salt in the electrolyte solution, and thus, the ethylene carbonate and propylene carbonate may preferably be used. Since an electrolyte solution having high electrical conductivity may be prepared when the above cyclic carbonate is mixed with low viscosity, low dielectric constant linear carbonate, such as ethylmethyl carbonate, diethyl carbonate, and dimethyl carbonate, in an appropriate ratio, the ethylene carbonate and propylene carbonate may more preferably be used.

Also, as the ester among the electrolyte solution solvents, a single compound selected from the group consisting of methyl acetate, ethyl acetate, propyl acetate, methyl propionate, ethyl propionate, γ-butyrolactone, γ-valerolactone, γ-caprolactone, α-valerolactone, and ε-caprolactone, or a mixture of at least two thereof may be used, but the present invention is not limited thereto.

The composition for a gel polymer electrolyte according to an embodiment of the present invention may further selectively contain other additives and inorganic particles, which may achieve such physical properties known in the art, to increase efficiency of a polymer network formation reaction of the oligomer and provide a resistance reduction effect, in addition to the above-described components. As the other additives, for example, additives, such as vinylene carbonate (VC), vinyl ethylene carbonate (VEC), propane sultone, succinonitrile (SN), adiponitrile (AdN), ethylene sulfate (ESa), propene sultone (PRS), fluoroethylene carbonate (FEC), $LiPO_2F_2$, lithium difluorooxalatoborate (LiODFB), lithium bis-(oxalato)borate (LiBOB), 3-trimethoxysilanyl-propyl-N-aniline (TMSPa), and tris(trimethylsilyl) phosphite (TMSPi), may all be used.

Also, as the inorganic particles, a single compound selected from the group consisting of $BaTiO_3$ having a dielectric constant of 5 or more, $BaTiO_3$, $Pb(Zr, Ti)O_3$ (PZT), $Pb_{1-a}La_aZr_{1-b}Ti_bO_3$ (PLZT, where $0<a<1$, $0<b<1$), $Pb(Mg_{1/3}Nb_{2/3})O_3$—$PbTiO_3$ (PMN-PT), hafnia ($HfO_2$), $SrTiO_3$, $SnO_2$, $CeO_2$, $MgO$, $NiO$, $CaO$, $ZnO$, $ZrO_2$, $Y_2O_3$, $Al_2O_3$, $TiO_2$, $SiC$, and a mixture thereof, or a mixture of at least two thereof may be used.

In addition, inorganic particles having lithium ion transfer capability, that is, lithium phosphate ($Li_3PO_4$), lithium titanium phosphate ($Li_cTi_d(PO_4)_3$, $0<c<2$, $0<d<3$), lithium aluminum titanium phosphate ($Li_{a1}Al_{b1}Ti_{c1}(PO_4)_3$, $0<a1<2$, $0<b1<1$, $0<c1<3$), (LiAlTiP)$_{a2}O_{b2}$-based glass ($0<a2<4$, $0<b2<13$) such as $14Li_2O-9Al_2O_3-38TiO_2-39P_2O_5$, lithium lanthanum titanate ($Li_{a3}La_{b3}TiO_3$, $0<a3<2$, $0<b3<3$), lithium germanium thiophosphate ($Li_{a4}Ge_{b4}P_{c2}S_d$, $0<a4<4$, $0<b4<1$, $0<c2<1$, $0<d<5$) such as $Li_{3.25}Ge_{0.25}P_{0.75}S_4$, lithium nitride ($Li_{a5}N_{b5}$, $0<a5<4$, $0<b5<2$) such as $Li_3N$, $SiS_2$-based glass ($Li_{a6}Si_{b6}S_{c3}$, $0<a6<3$, $0<b6<2$, $0<c3<4$) such as $Li_3PO_4$—$Li_2S$—$SiS_2$, $P_2S_5$-based glass ($Li_{a7}P_{b7}S_{c5}$, $0<a7<3$, $0<b7<3$, $0<c5<7$), such as LiI—$Li_2S$—$P_2S_5$, or a mixture thereof may be used.

<Gel Polymer Electrolyte>

Hereinafter, the gel polymer electrolyte according to the present invention will be described.

According to an embodiment of the present invention, the gel polymer electrolyte is a gel polymer electrolyte prepared by using the composition for a gel polymer electrolyte.

A conventional gel polymer electrolyte has limitations in that ionic conductivity is less than that of a liquid electrolyte and stability and mechanical properties are relatively inferior when compared with those of a solid polymer electrolyte.

However, the gel polymer electrolyte according to the present invention may improve the ionic conductivity and mechanical properties by forming a polymer network with the oligomer represented by Formula 1 which includes the units A and A' each independently containing a (meth) acrylate group, the units B and B' each independently containing an amide group, the units C and C' each independently containing an oxyalkylene group, and the unit D containing a siloxane group.

Also, since the composition for a gel polymer electrolyte of the present invention includes the anion stabilizing additive, the decomposition reaction of the non-aqueous solvent caused by the anions of the lithium salt, which are formed during the preparation of the electrolyte with the composition for a gel polymer electrolyte, and the side reaction between the electrode and the electrolyte may be controlled, and thus, life characteristics and performance of the battery may be improved.

For example, the gel polymer electrolyte according to the present invention is formed by polymerizing the composition for a gel polymer electrolyte according to a typical method known in the art. For example, the gel polymer electrolyte may be formed by in-situ polymerization of the composition for a gel polymer electrolyte in the secondary battery.

Specifically, the gel polymer electrolyte may be prepared by the steps of: (a) inserting an electrode assembly composed of a positive electrode, a negative electrode, and a separator disposed between the positive electrode and the negative electrode into a battery case, and (b) injecting the composition for a gel polymer electrolyte according to the present invention into the battery case and polymerizing the composition to form the gel polymer electrolyte.

An in-situ polymerization reaction in the lithium secondary battery may be performed by using E-beam, γ-ray, and room temperature/high temperature aging processes, and, according to an embodiment of the present invention, the in-situ polymerization reaction may be performed by thermal polymerization. In this case, polymerization time required may be in a range of about 2 minutes to about 12 hours, and thermal polymerization temperature may be in a range of 30° C. to 100° C.

Specifically, in the in-situ polymerization reaction in the lithium secondary battery, predetermined amounts of the polymerization initiator and the oligomer are added to an electrolyte solution containing a lithium salt and mixed, and the mixture is then injected into a battery cell. When an electrolyte injection hole of the battery cell is sealed and, for example, polymerization is then performed by heating the battery cell to 40° C. to 80° C. for 1 hour to 20 hours, a gel polymer electrolyte included in the form of a gel is prepared while the lithium salt-containing electrolyte solution is gelated.

As another method, after predetermined amounts of the polymerization initiator and the oligomer are added to an electrolyte solution containing the lithium salt and mixed, one surfaces of electrode and separator are coated with the mixture, curing (gelation) is performed by using heat or ultraviolet (UV) light, the electrode and/or the separator having the gel polymer electrolyte formed thereon are wound or stacked to prepare an electrode assembly, and a battery may then be prepared by inserting the electrode assembly into a battery case and re-injecting a conventional liquid electrolyte solution thereinto.

<Lithium Secondary Battery>

Next, the lithium secondary battery according to the present invention will be described. A secondary battery according to another embodiment of the present invention includes a negative electrode, a positive electrode, a separator disposed between the positive electrode and the negative electrode, and a gel polymer electrolyte. Since the gel polymer electrolyte is the same as described above, a detailed description thereof will be omitted.

Positive Electrode

The positive electrode may be prepared by coating a positive electrode collector with a positive electrode material mixture slurry including a positive electrode active material, a binder, a conductive agent, and a solvent.

The positive electrode collector is not particularly limited so long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used.

The positive electrode active material is a compound capable of reversibly intercalating and deintercalating lithium, wherein the positive electrode active material may specifically include a lithium composite metal oxide including lithium and at least one metal such as cobalt, manganese, nickel, or aluminum. Specifically, the lithium composite metal oxide may include lithium-manganese-based oxide (e.g., $LiMnO_2$, $LiMn_2O_4$, etc.), lithium-cobalt-based oxide (e.g., $LiCoO_2$, etc.), lithium-nickel-based oxide (e.g., $LiNiO_2$, etc.), lithium-nickel-manganese-based oxide (e.g., $LiNi_{1-Y1}Mn_{Y1}O_2$ (where $0<Y1<1$), $LiMn_{2-Z1}Ni_{Z1}O_4$ (where $0<Z1<2$), etc.), lithium-nickel-cobalt-based oxide (e.g., $LiNi_{1-Y2}Co_{Y2}O_2$ (where $0<Y2<1$), lithium-manganese-cobalt-based oxide (e.g., $LiCo_{1-Y3}Mn_{Y3}O_2$ (where $0<Y3<1$), $LiMn_{2-Z2}Co_{Z2}O_4$ (where $0<Z2<2$), etc.), lithium-nickel-manganese-cobalt-based oxide (e.g., $Li(Ni_{p1}Co_{q1}Mn_{r1})O_2$ (where $0<p1<1$, $0<q1<1$, $0<r1<1$, and $p1+q1+r1=1$) or $Li(Ni_{p2}Co_{q2}M_{r2})O_4$ (where $0<p2<2$, $0<q2<2$, $0<r2<2$, and $p2+q2+r2=2$), etc.), or lithium-nickel-cobalt-transition metal (M) oxide (e.g., $Li(Ni_{p3}Co_{q3}Mn_{r3}M_{S1})O_2$ (where M is selected from the group consisting of aluminum (Al), iron (Fe), vanadium (V), chromium (Cr), titanium (Ti), tantalum (Ta), magnesium (Mg), and molybdenum (Mo), and p3, q3, r3, and s1 are atomic fractions of each independent elements, wherein $0<p3<1$, $0<q3<1$, $0<r3<1$, $0<S1<1$, and $p3+q3+r3+S1=1$), etc.), and any one thereof or a compound of two or more thereof may be included.

Among these materials, in terms of the improvement of capacity characteristics and stability of the battery, the lithium composite metal oxide may include $LiCoO_2$, $LiMnO_2$, $LiNiO_2$, lithium nickel manganese cobalt oxide (e.g., $Li(Ni_{0.6}Mn_{0.2}Co_{0.2})O_2$, $Li(Ni_{0.5}Mn_{0.3}Co_{0.2})O_2$, or $Li(Ni_{0.8}Mn_{0.1}Co_{0.1})O_2$), or lithium nickel cobalt aluminum oxide (e.g., $LiNi_{0.8}Co_{0.15}Al_{0.05}O_2$, etc.), and, in consideration of a significant improvement due to the control of type and content ratio of elements constituting the lithium composite metal oxide, the lithium composite metal oxide may include $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, or $Li(Ni_{0.8}Mn_{0.1}Co_{0.1})O_2$, and any one thereof or a mixture of two or more thereof may be used.

The positive electrode active material may be included in an amount of 80 wt % to 99 wt %, preferably 85 wt % to 99 wt %, and more preferably 90 wt % to 98 wt % based on a total weight of a solid excluding the solvent in the positive electrode material mixture slurry.

The binder is a component that assists in the binding between the active material and the conductive agent and in the binding with the current collector, wherein the binder may be included in an amount of 1 wt % to 20 wt %, preferably 1 wt % to 15 wt %, and more preferably 1 wt % to 10 wt % based on the total weight of the solid excluding the solvent in the positive electrode material mixture slurry.

Examples of the binder may be polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene (PE), polypropylene, an ethylene-propylene-diene terpolymer (EPDM), a sulfonated EPDM, a styrene-butadiene rubber, a fluoro rubber, various copolymers, and the like.

The conductive agent is a component for further improving the conductivity of the positive electrode active material, wherein the conductive agent may be included in an amount of 1 wt % to 20 wt %, preferably 1 wt % to 15 wt %, and more preferably 1 wt % to 10 wt % based on the total weight of the solid excluding the solvent in the positive electrode material mixture slurry.

Any conductive agent may be used without particular limitation so long as it has conductivity without causing adverse chemical changes in the battery, and, for example, a conductive material, such as: graphite; a carbon-based material such as carbon black, acetylene black, Ketjen black, channel black, furnace black, lamp black, and thermal black; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used. Specific examples of a commercial conductive agent may include acetylene black-based products (Chevron Chemical Company, Denka black (Denka Singapore Private Limited), or Gulf Oil Company), Ketjen black, ethylene carbonate (EC)-based products (Armak Company), Vulcan XC-72 (Cabot Company), and Super P (Timcal Graphite & Carbon) and the like.

The solvent may include an organic solvent, such as N-methyl-2-pyrrolidone (NMP), and may be used in an amount such that desirable viscosity is obtained when the positive electrode active material as well as selectively the binder and the conductive agent are included. For example, the solvent may be included in an amount such that a concentration of a solid content including the positive electrode active material as well as selectively the binder and the conductive agent is in a range of 50 wt % to 95 wt %, preferably 70 wt % to 95 wt %, and more preferably 70 wt % to 90 wt %.

Negative Electrode

Also, the negative electrode, for example, may be prepared by coating a negative electrode collector with a negative electrode material mixture slurry including a negative electrode active material, a binder, a conductive agent, and a solvent.

The negative electrode collector generally has a thickness of 3 μm to 500 μm. The negative electrode collector is not particularly limited so long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, an aluminum-cadmium alloy, or the like may be used. Also, similar to the positive electrode collector, the negative electrode collector may have fine surface roughness to improve bonding strength with the negative electrode active material, and the negative electrode collector may be used in various shapes such as a film, a sheet, a foil, a net, a porous body, a foam body, a non-woven fabric body, and the like.

The negative electrode active material may include at least one negative electrode active material selected from the group consisting of natural graphite, artificial graphite, a carbonaceous material; lithium-containing titanium composite oxide (LTO); metals (Me) such as silicon (Si), tin (Sn), lithium (Li), zinc (Zn), Mg, cadmium (Cd), cerium (Ce), nickel (Ni), or Fe; alloys composed of the metals (Me); oxides (MeOx) of the metals (Me); and composites of the metals (Me) and carbon.

The negative electrode active material may be included in an amount of 80 wt % to 99 wt %, preferably 85 wt % to 99 wt %, and more preferably 90 wt % to 98 wt % based on a total weight of a solid excluding the solvent in the negative electrode material mixture slurry.

The binder is a component that assists in the binding between the conductive agent, the active material, and the current collector, wherein the binder may be typically included in an amount of 1 wt % to 20 wt %, preferably 1 wt % to 15 wt %, and more preferably 1 wt % to 10 wt % based on the total weight of the solid excluding the solvent in the negative electrode material mixture slurry.

Examples of the binder may be polyvinylidene fluoride (PVDF), polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene polymer (EPDM), a sulfonated EPDM, a styrene-butadiene rubber, a fluoro rubber, and various copolymers thereof.

The conductive agent is a component for further improving the conductivity of the negative electrode active material, wherein the conductive agent may be included in an amount of 1 wt % to 20 wt %, preferably 1 wt % to 15 wt %, and more preferably 1 wt % to 10 wt % based on the total weight of the solid excluding the solvent in the negative electrode material mixture slurry.

Any conductive agent may be used without particular limitation so long as it has conductivity without causing adverse chemical changes in the battery, and, for example, a conductive material, such as: graphite such as natural graphite or artificial graphite; carbon black such as acetylene black, Ketjen black, channel black, furnace black, lamp black, and thermal black; conductive fibers such as carbon fibers and metal fibers; metal powder such as fluorocarbon powder, aluminum powder, and nickel powder; conductive whiskers such as zinc oxide whiskers and potassium titanate whiskers; conductive metal oxide such as titanium oxide; polyphenylene derivatives and the like, may be used.

The solvent may include water or an organic solvent, such as N-methyl-2-pyrrolidone (NMP), and may be used in an amount such that desirable viscosity is obtained when the negative electrode active material as well as selectively the binder and the conductive agent are included. For example, the solvent may be included in an amount such that a concentration of a solid content including the negative electrode active material as well as selectively the binder and the conductive agent is in a range of 50 wt % to 95 wt %, for example, 70 wt % to 90 wt %.

Separator

Also, a typical porous polymer film used as a typical separator, for example, a porous polymer film prepared from a polyolefin-based polymer, such as an ethylene homopolymer, a propylene homopolymer, an ethylene-butene copolymer, an ethylene-hexene copolymer, and an ethylene-methacrylate copolymer, may be used alone or in a lamination therewith as the separator. Also, a typical porous nonwoven fabric, for example, a nonwoven fabric formed of high melting point glass fibers or polyethylene terephthalate fibers may be used, but the present invention is not limited thereto.

A shape of the lithium secondary battery of the present invention is not particularly limited, but a cylindrical type using a can, a prismatic type, a pouch type, or a coin type may be used.

According to another embodiment of the present invention, a battery module including the lithium secondary battery as a unit cell and a battery pack including the battery module are provided. Since the battery module and the battery pack include the lithium secondary battery having high capacity, high rate characteristics, and cycle characteristics, the battery module and the battery pack may be used as a power source of a medium and large sized device selected from the group consisting of an electric vehicle, a hybrid electric vehicle, a plug-in hybrid electric vehicle, and a power storage system.

Hereinafter, the present invention will be described in detail, according to specific examples. However, the following examples are merely presented to exemplify the present invention, and the scope of the present invention is not limited thereto. It will be apparent to those skilled in the art that various modifications and alterations are possible within the scope and technical spirit of the present invention. Such modifications and alterations fall within the scope of claims included herein.

EXAMPLES

1. Example 1

(1) Preparation of Composition for Gel Polymer Electrolyte

An electrolyte solution was prepared by dissolving $LiPF_6$ in a non-aqueous electrolyte solution solvent having a composition, in which a ratio of ethylene carbonate (EC) to ethylmethyl carbonate (EMC) was 3:7 (volume ratio), to obtain a $LiPF_6$ concentration of 1 M. Thereafter, 5 parts by weight of the oligomer represented by Formula 1-5 (molecular weight of about 9,000, and, in Formula 1-5, n=10, o=15, p=10, and q=7) based on 100 parts by weight of a composition for a gel polymer electrolyte, 2 parts by weight of the anion stabilizing additive represented by Formula 2-1 based on 100 parts by weight of the composition for a gel polymer electrolyte, and 0.4 part by weight of a polymerization initiator (AIBN) based on 100 parts by weight of the oligomer were included and mixed so that the electrolyte solution was included as a remainder to prepare the composition for a gel polymer electrolyte.

(2) Lithium Secondary Battery Preparation

A positive electrode active material ($LiNi_{1/3}Co_{1/3}Mn_{1/3}O_2$; NCM), carbon black as a conductive agent, and polyvinylidene fluoride (PVDF), as a binder, were mixed in a weight ratio of 94:3:3 and then added to N-methyl-2-pyrrolidone (NMP), as a solvent, to prepare a positive electrode material mixture slurry. An about 20 μm thick aluminum (Al) thin film, as a positive electrode collector, was coated with the positive electrode material mixture slurry and dried, and the coated Al thin film was then roll-pressed to prepare a positive electrode.

Carbon powder as a negative electrode active material, PVDF as a binder, and carbon black, as a conductive agent, were mixed in a weight ratio of 96:3:1 and then added to NMP, as a solvent, to prepare a negative electrode material mixture slurry. A 10 μm thick copper (Cu) thin film, as a negative electrode collector, was coated with the negative electrode material mixture slurry and dried, and the coated Cu thin film was then roll-pressed to prepare a negative electrode.

A battery was assembled using the positive electrode, the negative electrode, and a separator formed of three layers of polypropylene/polyethylene/polypropylene (PP/PE/PP), and, after the composition for a gel polymer electrolyte was injected into the assembled battery, the assembled battery was left standing for 2 days and was then heated at 70° C. for 5 hours to prepare a lithium secondary battery including a gel polymer electrolyte.

2. Example 2

A composition for a gel polymer electrolyte and a lithium secondary battery using the same were prepared in the same manner except that the anion stabilizing additive represented by Formula 3-1, instead of using the anion stabilizing additive represented by Formula 2-1, was used in Example 1.

COMPARATIVE EXAMPLES

1. Comparative Example 1

(1) Electrolyte Solution Preparation

A non-aqueous electrolyte solution was prepared by dissolving $LiPF_6$ in a non-aqueous electrolyte solvent having a composition, in which a ratio of ethylene carbonate (EC) to ethylmethyl carbonate (EMC) was 3:7 (volume ratio), to obtain a $LiPF_6$ concentration of 1 M.

(2) Lithium Secondary Battery Preparation $LiNi_{1/3}Co_{1/3}Mn_{1/3}O_2$ (NCM) as a positive electrode active material, carbon black as a conductive agent, and polyvinylidene fluoride (PVDF), as a binder, were mixed in a weight ratio of 94:3:3 and then added to N-methyl-2-pyrrolidone (NMP), as a solvent, to prepare a positive electrode material mixture slurry. An about 20 μm thick aluminum (Al) thin film, as a positive electrode collector, was coated with the positive electrode material mixture slurry and dried, and the coated Al thin film was then roll-pressed to prepare a positive electrode.

Carbon powder as a negative electrode active material, PVDF as a binder, and carbon black, as a conductive agent, were mixed in a weight ratio of 96:3:1 and then added to NMP, as a solvent, to prepare a negative electrode material mixture slurry. A 10 μm thick copper (Cu) thin film, as a negative electrode collector, was coated with the negative electrode material mixture slurry and dried, and the coated Cu thin film was then roll-pressed to prepare a negative electrode.

A battery was assembled using the positive electrode, the negative electrode, and a separator formed of three layers of polypropylene/polyethylene/polypropylene (PP/PE/PP). After the non-aqueous electrolyte solution was injected into the assembled battery, the assembled battery was stored at room temperature for 2 days to prepare a lithium secondary battery.

2. Comparative Example 2

(1) Preparation of Composition for Gel Polymer Electrolyte

An electrolyte solution was prepared by dissolving $LiPF_6$ in a non-aqueous electrolyte solution solvent having a composition, in which a ratio of ethylene carbonate (EC) to ethylmethyl carbonate (EMC) was 3:7 (volume ratio), to obtain a $LiPF_6$ concentration of 1 M. Thereafter, 5 parts by weight of a monomer represented by the following Formula 4 based on 100 parts by weight of a composition for a gel polymer electrolyte, 2 parts by weight of the anion stabilizing additive represented by Formula 3-1 based on 100 parts by weight of the composition for a gel polymer electrolyte, and 0.4 part by weight of a polymerization initiator (AIBN) based on 100 parts by weight of the monomer were included and mixed so that the electrolyte solution was included as a remainder to prepare the composition for a gel polymer electrolyte.

[Formula 4]

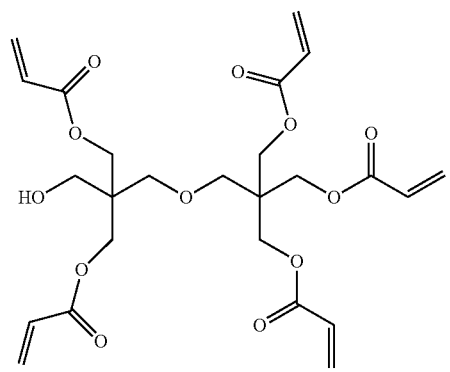

(2) Lithium Secondary Battery Preparation

A lithium secondary battery was prepared in the same manner as in Example 1 except that the composition for a gel polymer electrolyte prepared in Comparative Example 2 was used instead of the composition for a gel polymer electrolyte prepared in Example 1.

3. Comparative Example 3

After a composition for a gel polymer electrolyte was prepared in the same manner as in Example 1 except that the anion stabilizing additive represented by Formula 2-1 was not used in Example 1, a lithium secondary battery was prepared in the same manner as in Example 1.

4. Comparative Example 4

After a non-aqueous electrolyte solution was prepared in the same manner as in Comparative Example 1 except that 2 parts by weight of the anion stabilizing additive represented by Formula 2-1 was added to the non-aqueous electrolyte solution of Comparative Example 1 based on 100 parts by weight of the non-aqueous electrolyte solution and used, a lithium secondary battery was prepared in the same manner as in Comparative Example 1.

5. Comparative Example 5

After a composition for a gel polymer electrolyte was prepared in the same manner as in Comparative Example 2 except that 2 parts by weight of the anion stabilizing additive represented by Formula 2-1, instead of using the anion stabilizing additive represented by Formula 3-1, was used based on 100 parts by weight of the non-aqueous electrolyte solution in Comparative Example 2, a lithium secondary battery was prepared in the same manner as in Comparative Example 2.

EXPERIMENTAL EXAMPLES

1. Experimental Example 1

A state of charge (SOC) of each of the secondary batteries prepared according to Examples 1 and 2 and Comparative Examples 1 to 5 was set to 50% at 25° C., and each secondary battery was then subjected to a 5 C discharge pulse for 10 seconds to confirm a resistance value of each lithium secondary battery through the voltage drop thus obtained. The measured resistance values are presented in FIG. 1, and the measured voltage values are presented in FIG. 2.

First, when the resistance values of the lithium secondary batteries of Examples 1 and 2 and Comparative Examples 1 to 5 were confirmed through a graph of FIG. 1, it may be confirmed that the resistance values of the comparative examples were larger than those of the examples.

Figure 2:
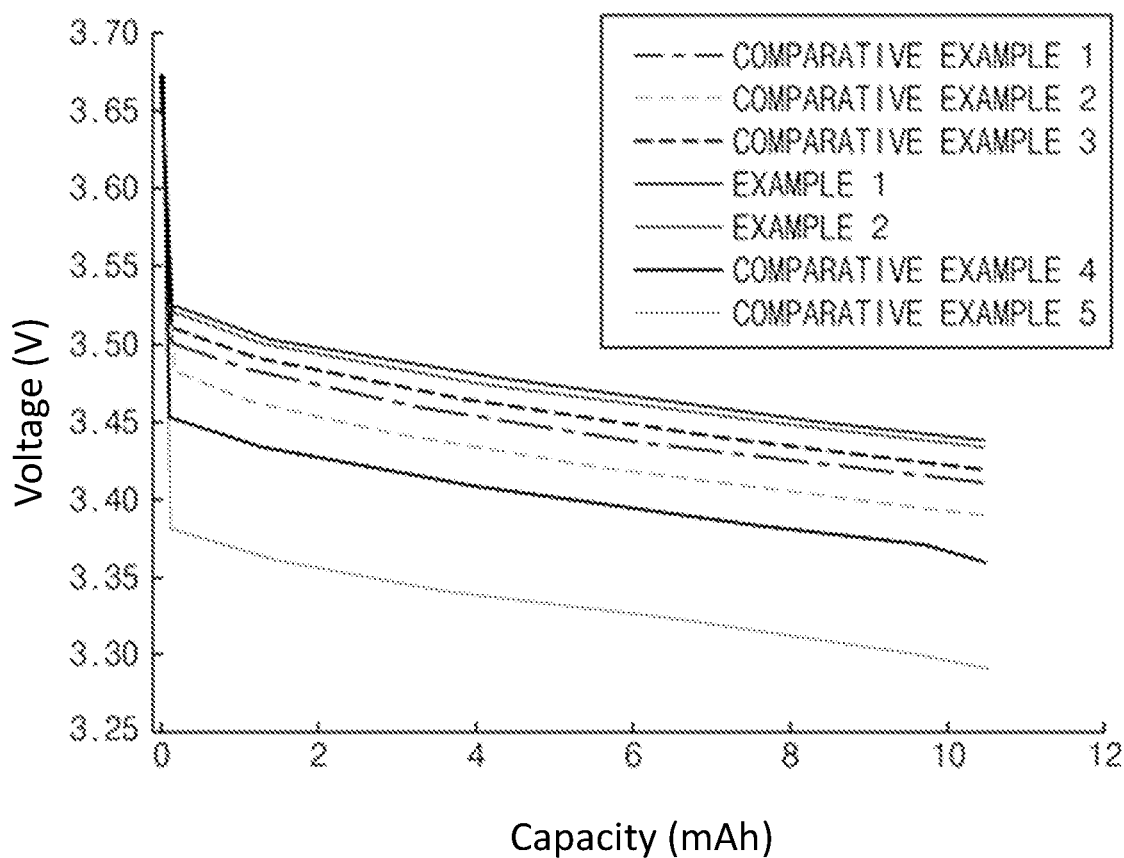
FIG. 2 is a graph showing measured voltages of the secondary batteries according to Experimental Example 1 of the present invention.

Also, referring to a graph of FIG. 2, it may be understood that, with respect to the examples, voltage drops occurred near 3.53 V, but, with respect to the comparative examples, voltage drops respectively occurred near 3.51 V to 3.46 V due to the high resistance values.

The reason for this is that, with respect to the examples, anions generated by the lithium salt were stabilized to suppress a side reaction between the electrolyte and the electrode and also suppress decomposition of the non-aqueous solvent in comparison to the comparative examples.

2. Experimental Example 2

After each of the lithium secondary batteries prepared according to Examples 1 and 2 and Comparative Examples 1 to 5 was stored at 50% SOC and 25° C. for 1 hour, AC impedance of the battery was measured while scanned from 1 KHz to 1 mHz. In this case, an amplitude of alternating current was 10 mV, and a direct current (DC) potential of the battery was 3.68 V. The results thereof are presented in FIG. 3.

Figure 3:
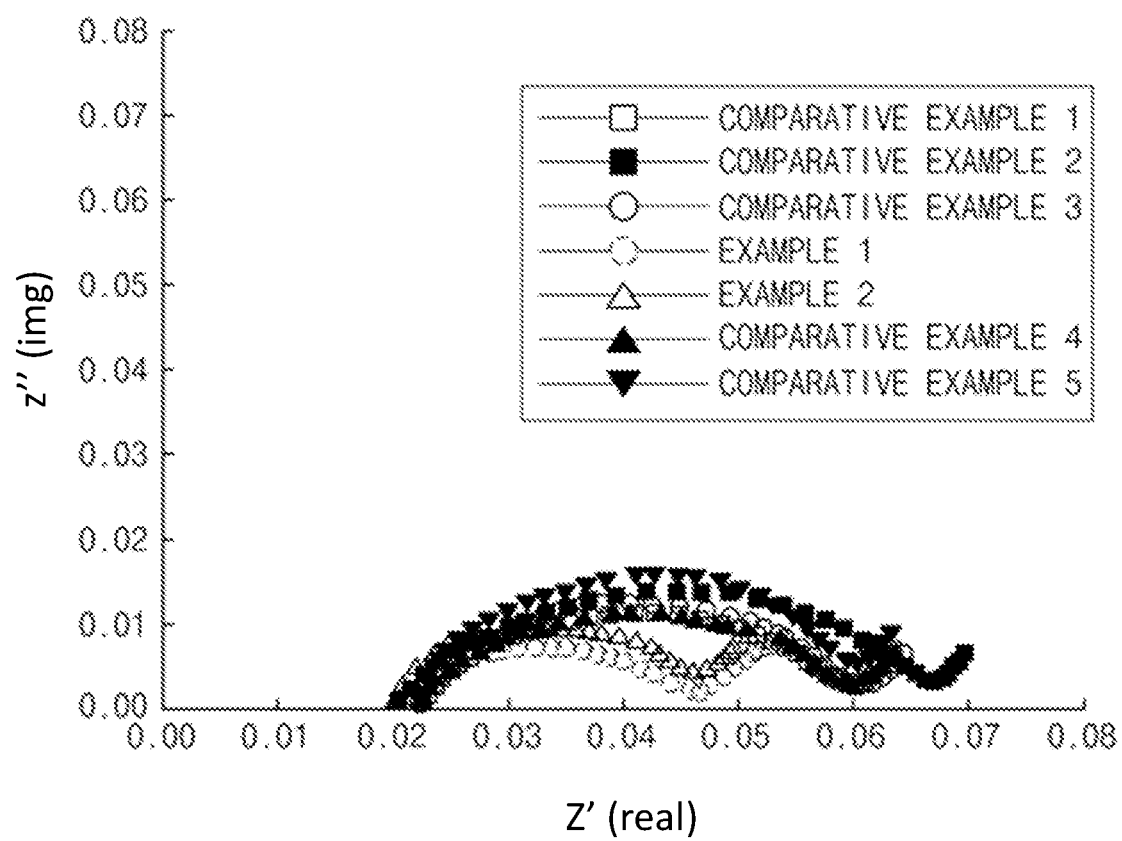
FIG. 3 is a graph showing AC impedances of secondary batteries according to Experimental Example 2 of the present invention.

In a graph of FIG. 3, a point of intersection with the X-axis denotes ohmic resistance of the battery, and a half circle in the rear part denotes resistance by a solid electrolyte interface (SEI) formed on the surface of an electrode plate. That is, it denotes that the smaller the diameter of the half circle is, the smaller the resistance value caused by the SEI is. In this case, with respect to the examples, it may be confirmed that resistance values were smaller than those of the comparative examples.

The reason for this is that, with respect to the examples, since the anions generated by the lithium salt existed in a stable state, the side reaction between the electrolyte and the electrode was small and a degree of decomposition of the non-aqueous solvent was low in comparison to the comparative examples.

3. Experimental Example 3

Each of the lithium secondary batteries prepared according to Examples 1 and 2 and Comparative Examples 1 to 5 was stored at a high temperature of 60° C. for 10 weeks at a SOC of 100% (4.15 V). Thereafter, after the SOC of each of the lithium secondary batteries was set to 50% at 25° C. once a week on a weekly basis, each lithium secondary battery was subjected to a 5 C discharge pulse for 10 seconds to measure a resistance value, and a resistance change rate was then measured based on the resistance value measured initially (0 week). The results thereof are presented in FIG. 4.

Figure 4:
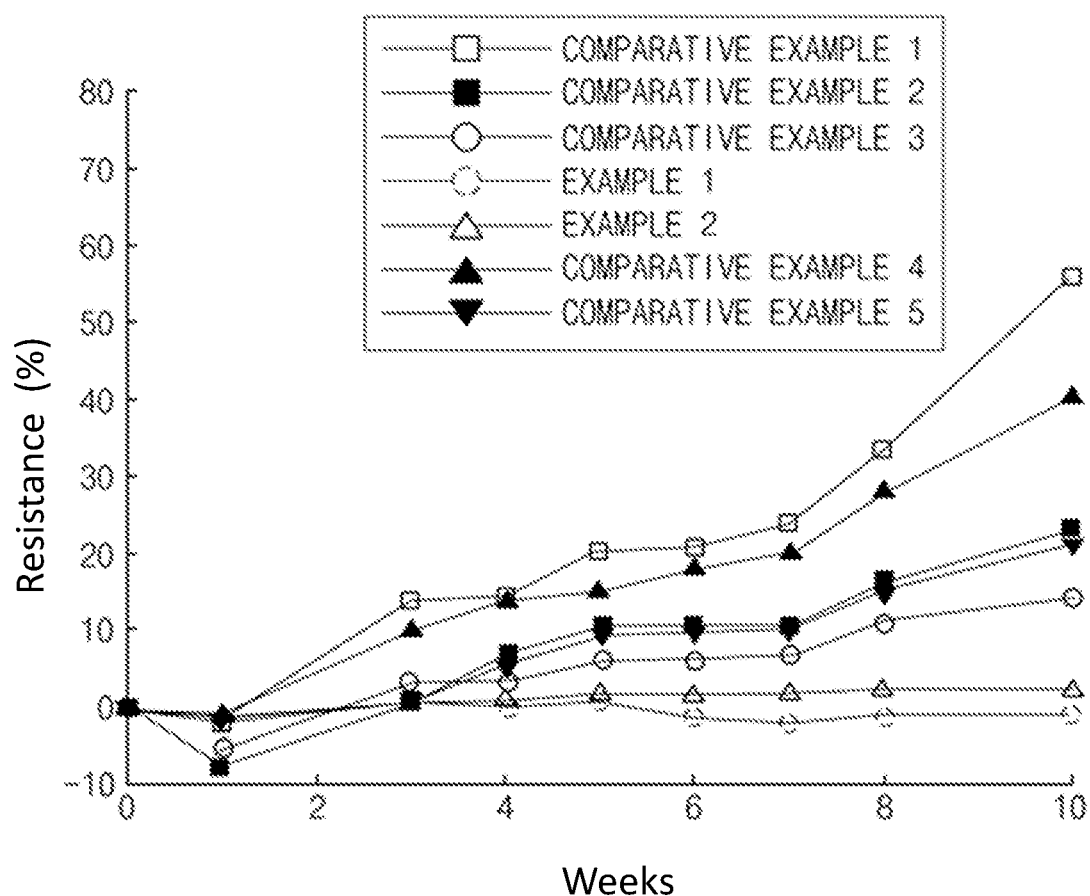
FIG. 4 is a graph showing results of measuring resistance change rates with time after high-temperature storage of secondary batteries according to Experimental Example 3 of the present invention.

Referring to the results of FIG. 4, it may be confirmed that, since the resistance values of Examples 1 and 2 were constantly maintained even after the high-temperature storage, the resistance change rates were not significantly increased. In contrast, with respect to the comparative examples, it may be confirmed that the resistance change rates were significantly increased. The reason for this is that, since the anions were maintained in a stabilized state even in a high-temperature environment, the examples had excellent thermal stability when the examples and the comparative examples were compared.

The invention claimed is:
1. A composition for a gel polymer electrolyte, the composition comprising:
an oligomer represented by Formula 1-5;
an anion stabilizing additive;
a polymerization initiator;
a lithium salt; and
a non-aqueous solvent,
wherein the anion stabilizing additive comprises a phosphite-based compound represented by Formula 2-1:

[Formula 1-5]

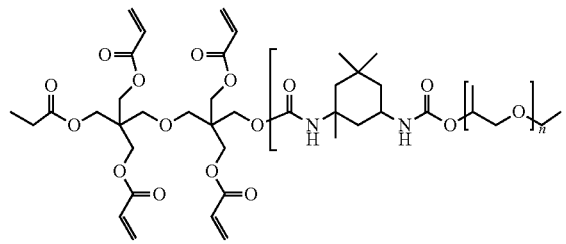

-continued

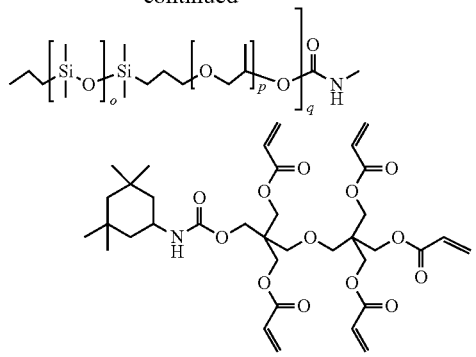

wherein, in Formula 1-5,
each of n, o, and p is an integer of 1 to 30, and q is an integer of 1 to 100,

[Formula 2-1]

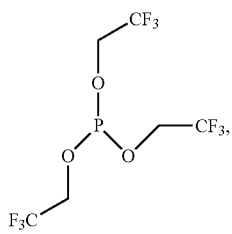

and
wherein the anion stabilizing additive is included in an amount of 0.1 part by weight to 2 parts by weight based on 100 parts by weight of the composition for a gel polymer electrolyte, and
the oligomer is included in an amount of 0.5 parts by weight to 20 parts by weight based on 100 parts by weight of the composition for a gel polymer electrolyte.

2. The composition of claim 1, wherein the oligomer is included in an amount of 1.0 parts by weight to 20 parts by weight based on 100 parts by weight of the composition for a gel polymer electrolyte.

3. The composition of claim 1, wherein the oligomer is included in an amount of 1.5 parts by weight to 20 parts by weight based on 100 parts by weight of the composition for a gel polymer electrolyte.

4. The composition of claim 1,
wherein the polymerization initiator comprises at least one selected from the group consisting of benzoyl peroxide, acetyl peroxide, dilauryl peroxide, di-tert-butyl peroxide, t-butyl peroxy-2-ethyl-hexanoate, cumyl hydroperoxide, and hydrogen peroxide, 2,2'-azobis(2-cyanobutane), 2,2'-azobis(methylbutyronitrile), 2,2'-azobis(iso-butyronitrile) (AIBN), and 2,2'-azobis(dimethylvaleronitrile) (AMVN).

5. The composition of claim 1,
wherein the polymerization initiator is included in an amount of 0.01 part by weight to 5 part by weight based on 100 parts by weight of the oligomer.

6. The composition of claim 1,
wherein the polymerization initiator is included in an amount of 0.05 part by weight to 5 part by weight based on 100 parts by weight of the oligomer.

7. The composition of claim 1,
wherein the polymerization initiator is included in an amount of 0.1 part by weight to 5 part by weight based on 100 parts by weight of the oligomer.

8. The composition of claim 1,
wherein the lithium salt comprises at least one selected from the group consisting of $LiPF_6$, $LiBF_4$, $LiSbF_6$, $LiAsF_6$, $LiClO_4$, $LiN(C_2F_5SO_2)_2$, $LiN(CF_3SO_2)_2$, $CF_3SO_3Li$, $LiC(CF_3SO_2)_3$, $LiC_4BO_8$, LiTFSI, and LiFSI.

9. The composition of claim 1,
wherein the lithium salt is included in an amount of 5 parts by weight to 30 parts by weight based on 100 parts by weight of the composition for a gel polymer electrolyte.

10. The composition of claim 1,
wherein the lithium salt is included in an amount of 10 parts by weight to 30 parts by weight based on 100 parts by weight of the composition for a gel polymer electrolyte.

11. The composition of claim 1,
wherein the lithium salt is included in an amount of 15 parts by weight to 30 parts by weight based on 100 parts by weight of the composition for a gel polymer electrolyte.

12. The composition of claim 1, wherein the non-aqueous solvent comprises at least one selected from the group consisting of an ether compound, an ester compound, an amide compound, a linear carbonate compound, a cyclic carbonate compound, a nitrile compound and a mixture thereof.

13. The composition of claim 1, wherein the non-aqueous solvent comprises a cyclic carbonate, a linear carbonate, or a mixture thereof.

14. The composition of claim 13, wherein the cyclic carbonate compound comprises at least one selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, a halide thereof, and a mixture thereof.

15. The composition of claim 13, wherein the linear carbonate compound comprises at least one selected from the group consisting of dimethyl carbonate (DMC), diethyl carbonate (DEC), dipropyl carbonate (DPC), ethylmethyl carbonate (EMC), methylpropyl carbonate (MPC), and ethylpropyl carbonate (EPC), and a mixture thereof.

16. A gel polymer electrolyte prepared by using the composition for a gel polymer electrolyte according to claim 1.

17. A lithium secondary battery comprising:
a positive electrode;
a negative electrode;
a separator disposed between the positive electrode and the negative electrode; and
the gel polymer electrolyte of claim 16.

* * * * *